United States Patent [19]
Silverman

[11] 3,735,472
[45] May 29, 1973

[54] PIPE FITTING WELD ALIGNMENT APPARATUS

[76] Inventor: Irving Silverman, 5152 Walsh Way, San Diego, Calif. 92115

[22] Filed: Mar. 26, 1971

[21] Appl. No.: 128,408

[52] U.S. Cl. .................. 29/272, 29/200 P, 228/44, 269/48.1
[51] Int. Cl. .............................................. B25b 27/14
[58] Field of Search ........................ 228/4, 44, 45; 269/48.1; 29/200 J, 200 P, 237, 271, 272

[56] References Cited

UNITED STATES PATENTS

| | | | |
|---|---|---|---|
| 2,667,139 | 1/1954 | Campbell | 269/48.1 |
| 3,030,903 | 4/1962 | Morris | 269/48.1 |
| 3,115,859 | 12/1963 | Häussler et al. | 113/102 |
| 3,229,972 | 1/1966 | Cunningham | 269/48.1 |
| 3,330,021 | 7/1967 | Jacobsen | 29/200 |
| 2,977,916 | 4/1961 | Hawkins | 29/272 X |

FOREIGN PATENTS OR APPLICATIONS

| | | | |
|---|---|---|---|
| 15,011 | 2/1904 | Austria | 269/48.1 |
| 363,213 | 8/1962 | Switzerland | 269/48.1 |

Primary Examiner—J. Spencer Overholser
Assistant Examiner—Robert J. Craig
Attorney—Carl R. Brown and Neil F. Martin

[57] ABSTRACT

Apparatus for holding pipe sections in alignment during welding, particularly pipe fittings such as elbows and the like. Two compact chuck units are mounted by a simple jig in the confronting ends of the pipe sections to be joined, and are then coupled by an adjustable connector to set the position of the sections. After initial welding, the connector and chuck units are removed through the pipe fitting. The apparatus is adaptable to a wide range of pipe sizes.

3 Claims, 6 Drawing Figures

PATENTED MAY 29 1973 3,735,472

INVENTOR.
IRVING SILVERMAN
BY
Brown & Martin
ATTORNEYS

INVENTOR.
IRVING SILVERMAN
BY Brown & Martin
ATTORNEYS 3,735,472

PIPE FITTING WELD ALIGNMENT APPARATUS

BACKGROUND OF THE INVENTION

In welding sections of pipe together, many different devices have been used to hold the sections in alignment. The most common types are expanding sleeves or internal jaw elements which fit inside and bridge the gap between pipe sections. Such devices are restricted to joining straight pipe sections, since they are usually elongated and cannot be maneuvered around a turn in the pipe. Another type is an internal band which bridges the joint and has portions which project outwardly between the pipe sections as spacers, the unit becoming part of the welded joint and forming an internal obstruction at the joint. External clamp types are difficult to align accurately and obstruct the welding process.

SUMMARY OF THE INVENTION

The apparatus described herein includes a pair of compact expanding chucks which are mounted in the confronting ends of the pipe sections to be joined, a simple removable jig being used to align the chucks. A single connecting element couples the chucks in axial alignment and is adjustable for spacing the pipe sections for a proper weld. After tack welding the joint, the connecting element is removed and the chucks are loosened and removed one at a time. Due to their compact configuration, the chucks can be removed through an elbow or other such pipe fitting. Interchangeable extensions can be attached to the jaw elements of the chucks, to adapt the basic chucks to a wide range of pipe sizes.

The primary object of this invention, therefore, is to provide a new and improved pipe fitting weld alignment apparatus.

Another object of this invention is to provide a new and improved weld alignment apparatus using adjustable chuck units which can be removed through an elbow or the like.

A further object of this invention is to provide a new and improved weld alignment apparatus in which the chuck units are easily mounted in proper alignment and are joined by a single, quickly removable aligning and spacing element.

Other objects and many advantages of this invention will become more apparent upon a reading of the following detailed description and an examination of the drawings, wherein like reference numerals designate like parts throughout.

DESCRIPTION OF THE PREFERRED EMBODIMENT

Figure 1:
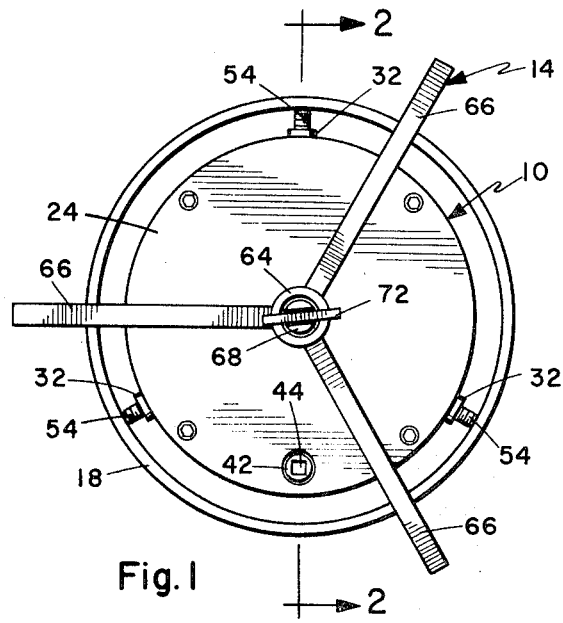
FIG. 1 is an end view of a chuck unit, jig mounted in a pipe section.

The complete apparatus comprises a pair of chucks 10 and 12, a positioning jig 14 and a coupling pin 16. In a typical use the apparatus is shown connecting a straight pipe 18 and an elbow 20.

Chuck 10 has a cylindrical body 22 enclosed by a front plate 24 and a back plate 26. Rotatably mounted in the body 22 is a gear plate 28 having on its front face a continuous spiral track 30. The spiral track actuates three jaw pins 32 which project radially through the peripheral wall of body 22, each jaw pin having teeth 34 which engage the spiral track. On the rear face of gear plate 28 is a peripheral gear 36, which is engaged by a small pinion 38 on a shaft 40 at the periphery of the gear plate. The shaft 40 is journalled in back plate 26 and has a boss portion 42 which projects through front plate, the boss portion having a wrench receiving socket 44.

Figure 6:
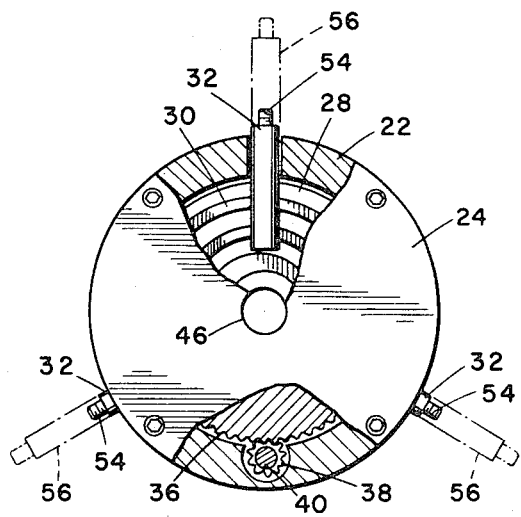
FIG. 6 is an end view of a chuck unit, with portions cut away to show the mechanism.

Front plate 24 has an axial bore 46, and the gear plate 28 has a similar axial bore 48. The back plate 26 has a threaded axial bore 50 to fit the threaded end 52 of coupling pin 16, which passes through bores 46 and 48. Jaw pins 32 have threaded studs 54 at their outer ends to facilitate attachment of extension pins 56, as indicated in broken line in FIG. 6. By using extension pins of suitable length, the basic chuck can be adapted to fit larger pipes.

Chuck 12 is similar to chuck 10 except for two minor details and the corresponding parts are similarly numbered. The differences are in the back plate 26, which has a smooth clearance bore 58 for coupling pin 16, and the pinion shaft 40 which has a second boss portion 60 projecting through the back plate 26. Boss portion 60 has a wrench receiving socket 62, so that chuck 12 is operable from either side.

Figure 5:
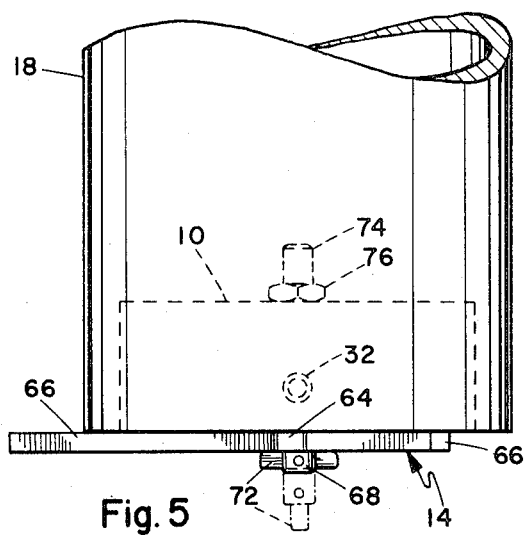
FIG. 5 is a top plan view of the structure as shown in FIG. 1.

Jig 14 is a unitary rigid member comprising a ring-like hub 64 with radially extending arms 66 in a common plane. For assembling the apparatus the jig 14 is held against front plate 24 of chuck 10 by a clamp bolt 68 through the hub 64. The clamp bolt has a slotted end 70 in which is a pivotally mounted T-bar 72, movable between a clamping position across the hub 64, as in full line position in FIGS. 1 and 5, and a release position in axial alignment with the pin, as in broken line in FIG. 5. Clamp bolt 68 is substantially smaller than coupling pin 16 and is a clearance fit through threaded bore 50, the clamp bolt having a threaded end 74 and being held by a nut 76 against back plate 26.

Figure 2:
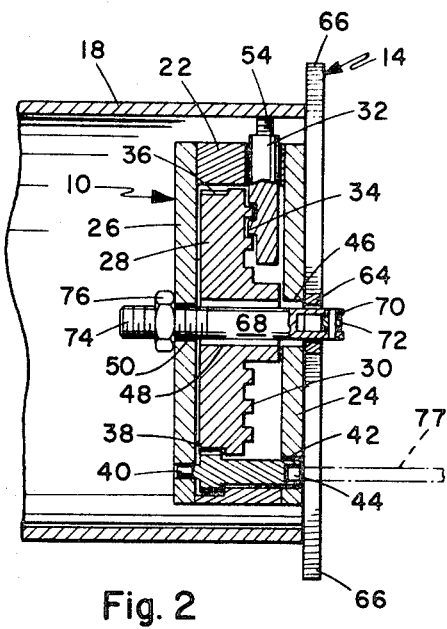
FIG. 2 is a sectional view taken on line 2—2 of FIG. 1.

With the jib 14 clamped on chuck 10, the chuck is inserted in pipe 18 until the jig arms 66 rest on the end of the pipe. A wrench 77 is inserted in socket 44, as in broken line in FIG. 2, and pinion 38 is turned to expand the chuck by driving jaw pins 32 outwardly to contact the pipe. The chuck is self-centering and, being held in parallel face alignment with the end of the pipe by the jig, is clamped in close axial alignment in the pipe. When the chuck is secure, the T-bar 72 is turned to loosen clamp bolt 68 from nut 76, until the T-bar can be turned to the in line position and the jig 14 is removed. Jig 14 is then attached to chuck 12 and the above steps are repeated to secure chuck 12 in the elbow 20, after which the jig is removed.

By reaching through the elbow 20, coupling pin 16 is inserted through chuck 12 and into chuck 10, the threaded end 52 being screwed into bore 50. The coupling pin has a large knob 78, which facilitates drawing the pipe sections together until a suitable gap remains for a weld. A wrench socket could be provided in knob 78 is necessary since manual access may be restricted in some instances. It should be noted that the elbow has freedom of 360° of rotation for orientation, after the chucks are clamped, without losing axial or gap alignment. This is not possible with external clamp means, or with the usual internal mandrel type. With the elbow in correct orientation, several tack welds 80 are made to secure the joint, as in FIG. 3.

Figure 3:
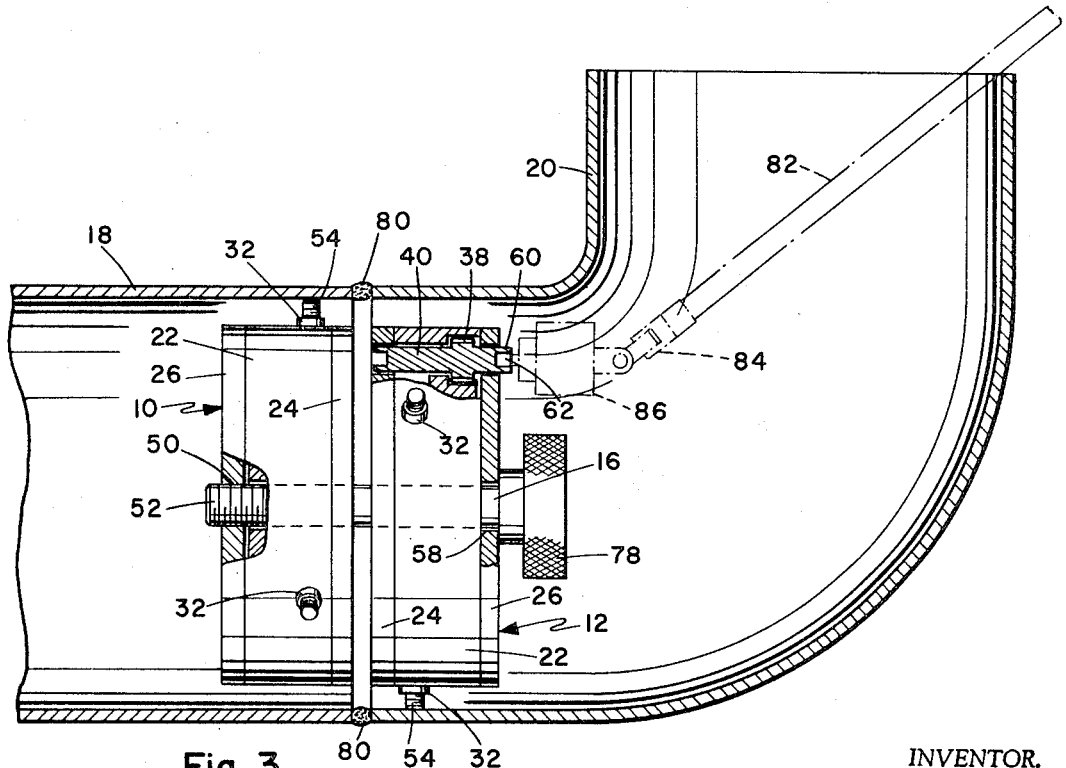
FIG. 3 is a sectional view of a pipe and elbow connection showing the complete assembly of the apparatus.
Figure 4:
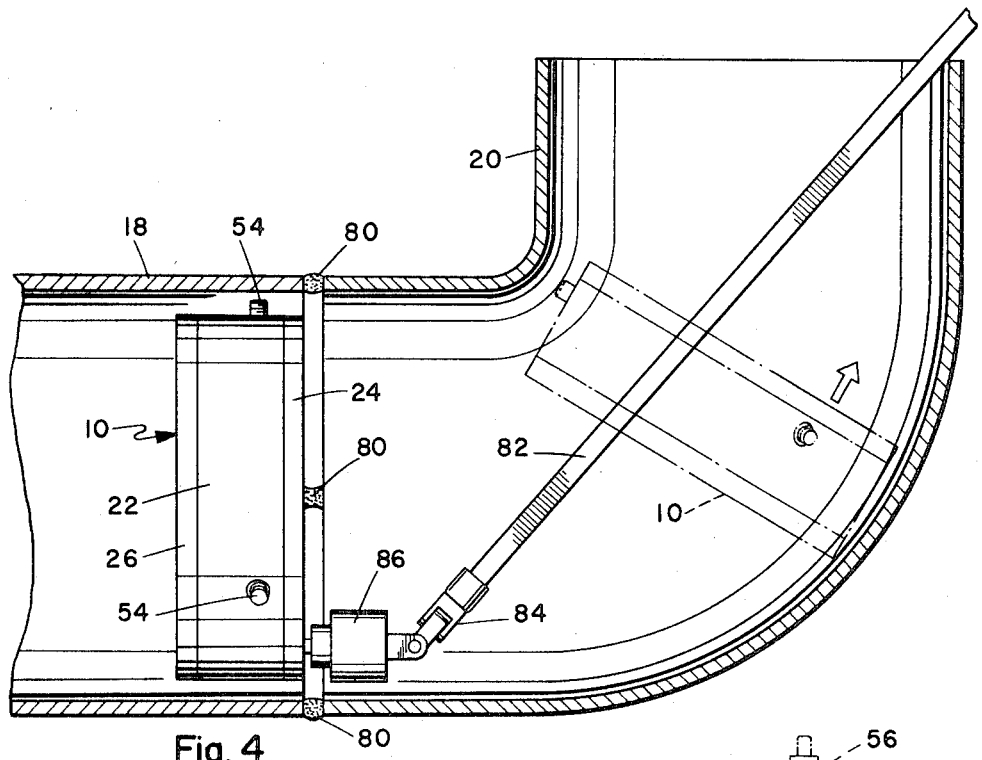
FIG. 4 is a view similar to FIG. 3, showing removal of a chuck unit.

Coupling pin 16 is then unscrewed and removed and a wrench 82 is inserted through the elbow 20 into socket 62, as in broken line in FIG. 3. A universal coupling 84 and a ratchet head 86 simplify the operation of the wrench to retract the jaw pins 32 and allow the chuck 12 to be removed through the elbow. The wrench is then applied to socket 44 to release chuck 10, as in FIG. 4, the chuck being removed through the elbow as shown, in the broken line position. Welding of the joint can then be completed without fear of damage to the joint alignment apparatus.

The apparatus is primarily adapted to use with pipe of 4 inches diameter or larger, since access is needed for manual adjustment and removal. With extensions the basic chuck can be made to fit up to 12 inch pipe, which covers the range of the most used sizes of welded pipe.

Having described my invention, I now claim.

1. Pipe fitting weld alignment apparatus comprising a pair of short cylindrical chuck units, each individually having its own jaw elements adjustable substantially radially to grip the interior of a pipe, pipe attaching means having removable clamp means for attaching the pipe attaching means to each chuck unit, said pipe attaching means having arms for engagement with the end of a pipe with the chuck unit held in substantially axial alingment in the pipe, coupling means for adjustably interconnecting said chuck units in axial alignment, and said jaw elements have threaded stud portions on the outer ends thereof, and including jaw extension means securable on the inner ends of said stud portions.

2. A pipe fitting weld alignment apparatus as claimed in claim 1 in which, each of said chuck units has an axial bore, said coupling means comprising a pin extending through said bores and having threaded adjustment means.

3. A pipe fitting weld alignment apparatus as claimed in claim 2 in which, said pipe attachment means has a hub from which said arms extend in coplanar alignment, said clamp means comprising a bolt passing through said hub and the axial bore of a chuck unit to hold the pipe attachment means against one end face of the chuck unit, and a nut threaded on said bolt to clamp against the other end face of the chuck unit.

* * * * *